United States Patent
Khoshkava et al.

(10) Patent No.: US 10,416,768 B2
(45) Date of Patent: Sep. 17, 2019

(54) UNITARY SENSOR AND HAPTIC ACTUATOR

(71) Applicant: Immersion Corporation, San Jose, CA (US)

(72) Inventors: Vahid Khoshkava, Montreal (CA); Abdelwahab Hamam, San Jose, CA (US); Juan Manuel Cruz Hernandez, Montreal (CA)

(73) Assignee: Immersion Corporation, San Jose, CA (US)

(*) Notice: Subject to any disclaimer, the term of this patent is extended or adjusted under 35 U.S.C. 154(b) by 179 days.

(21) Appl. No.: 15/392,784

(22) Filed: Dec. 28, 2016

(65) Prior Publication Data

US 2018/0181202 A1 Jun. 28, 2018

(51) Int. Cl.
*G06F 3/041* (2006.01)
*G06F 3/044* (2006.01)
*G06F 3/01* (2006.01)

(52) U.S. Cl.
CPC .............. *G06F 3/016* (2013.01); *G06F 3/044* (2013.01); *G06F 3/0414* (2013.01); *G06F 3/0416* (2013.01); *G06F 2203/04102* (2013.01)

(58) Field of Classification Search
CPC ........ G06F 3/016; G06F 3/044; G06F 3/0414; G06F 3/0416; G06F 2203/04102
See application file for complete search history.

(56) References Cited

U.S. PATENT DOCUMENTS 6,629,341 B2 10/2003 Wilkie et al.
6,924,787 B2 8/2005 Kramer et al.
(Continued)

FOREIGN PATENT DOCUMENTS

CN 202395745 U 8/2012
CN 102662477 A 9/2012
(Continued)

OTHER PUBLICATIONS

Strategic Polymer Sciences, Inc., "Revolutionary Electro Mechanical Polymer Actuators," http://www.strategicpolymers.com/technology, downloaded on Apr. 11, 2013, 2 pages.
(Continued)

*Primary Examiner* — Robert J Michaud
(74) *Attorney, Agent, or Firm* — Miles & Stockbridge P.C.

(57) ABSTRACT

A bi-functional apparatus for sensing touch and delivering a haptic signal. The bi-functional apparatus comprises first and second electrodes. The first electrode provides a haptic interface for delivering an electrostatic force and has a top surface and a bottom surface. A dielectric insulator covers the top surface of the first electrode. A sensor is positioned between the bottom surface of the first electrode and the second electrode. The sensor selectively provides electrical conductivity between the first and second electrodes in response to at least a threshold amount of pressure exerted against the dielectric insulator. A method of sensing touch and delivering a haptic signal with a single device. The method comprises receiving an input at a touch surface of a dielectric insulator layered over a first electrode; in response to receiving the input at the touch surface, increasing the electrical conductivity of a sensor positioned between the first electrode and a second electrode; in response to increasing electrical conductivity of the sensor, conducting an electrical current between the first and second electrodes; and in response to conducting an electrical current between the first and second electrodes, applying a haptic drive signal to the first electrode, the haptic drive signal creating an electrostatic force in the dielectric insulator.

24 Claims, 6 Drawing Sheets

(56) References Cited

U.S. PATENT DOCUMENTS

| | | |
|---|---|---|
| 7,196,688 B2 | 3/2007 | Schena |
| 7,339,572 B2 | 3/2008 | Schena |
| 7,511,706 B2 | 3/2009 | Schena |
| 7,561,141 B2 | 7/2009 | Shahoian et al. |
| 7,679,611 B2 | 3/2010 | Schena |
| 7,924,144 B2 | 4/2011 | Makinen et al. |
| 8,004,492 B2 | 8/2011 | Kramer et al. |
| 8,174,372 B2 | 5/2012 | da Costa |
| 8,390,594 B2 | 3/2013 | Modarres et al. |
| 8,405,618 B2 | 3/2013 | Colgate et al. |
| 8,659,210 B2 | 2/2014 | Jiang et al. |
| 8,780,053 B2 | 7/2014 | Colgate et al. |
| 8,791,902 B2 | 7/2014 | Colgate et al. |
| 8,836,664 B2 | 9/2014 | Colgate et al. |
| 8,976,501 B2 | 3/2015 | Smoot et al. |
| 2006/0028095 A1 | 2/2006 | Maruyama et al. |
| 2007/0236450 A1 | 10/2007 | Colgate et al. |
| 2008/0088580 A1 | 4/2008 | Poupyrev et al. |
| 2008/0303782 A1 | 12/2008 | Grant et al. |
| 2009/0128503 A1 | 5/2009 | Grant et al. |
| 2009/0250267 A1 | 10/2009 | Heubel et al. |
| 2009/0284485 A1 | 11/2009 | Colgate et al. |
| 2009/0322496 A1 | 12/2009 | da Costa |
| 2010/0085169 A1 | 4/2010 | Poupyrev et al. |
| 2010/0108408 A1 | 5/2010 | Colgate et al. |
| 2010/0109486 A1* | 5/2010 | Polyakov ............. G06F 3/0202 |
| | | 310/365 |
| 2010/0141407 A1 | 6/2010 | Heubel et al. |
| 2010/0231539 A1 | 9/2010 | Cruz-Hernandez et al. |
| 2010/0231540 A1 | 9/2010 | Cruz-Hernandez et al. |
| 2010/0231541 A1 | 9/2010 | Cruz-Hernandez et al. |
| 2010/0231550 A1 | 9/2010 | Cruz-Hernandez et al. |
| 2010/0283727 A1 | 11/2010 | Jiang et al. |
| 2010/0283731 A1 | 11/2010 | Grant et al. |
| 2010/0309142 A1 | 12/2010 | Cruz-Hernandez et al. |
| 2011/0260988 A1 | 10/2011 | Colgate et al. |
| 2011/0261021 A1 | 10/2011 | Modarres et al. |
| 2012/0274599 A1* | 11/2012 | Schediwy ............. G06F 3/016 |
| | | 345/174 |
| 2012/0286847 A1 | 11/2012 | Peshkin et al. |
| 2012/0313860 A1 | 12/2012 | Hashimura et al. |
| 2013/0016042 A1* | 1/2013 | Makinen ............. G06F 3/016 |
| | | 345/168 |
| 2013/0133494 A1 | 5/2013 | Fuiwara |
| 2014/0139327 A1 | 5/2014 | Bau et al. |
| 2014/0191973 A1 | 7/2014 | Zellers et al. |
| 2014/0267114 A1 | 9/2014 | Lisseman et al. |
| 2014/0347323 A1 | 11/2014 | Colgate et al. |
| 2014/0375580 A1 | 12/2014 | Peshkin et al. |
| 2015/0061703 A1 | 3/2015 | Jiang et al. |
| 2015/0316986 A1* | 11/2015 | Xue ............. G06F 3/041 |
| | | 345/173 |
| 2016/0004309 A1 | 1/2016 | Modarres et al. |
| 2016/0048207 A1* | 2/2016 | van der Avoort ....... G06F 3/016 |
| | | 345/174 |
| 2016/0124559 A1 | 5/2016 | Linn |
| 2016/0238441 A1* | 8/2016 | Chu ............. A61B 5/14552 |
| 2017/0031504 A1* | 2/2017 | Hwang ............. G06F 3/0488 |

FOREIGN PATENT DOCUMENTS

| | | |
|---|---|---|
| EP | 2963523 A1 | 1/2016 |
| WO | 2009037379 A1 | 3/2009 |
| WO | 2013060932 A1 | 5/2013 |
| WO | 2015106183 A1 | 7/2015 |

OTHER PUBLICATIONS

European Patent Office, Extended European Search Report for European Patent Application No. 17002055.6 dated May 11, 2018, 13 pages.

Openmaterials, "Quantum tunnelling composite," Retrieved from http://openmaterials.org/materials-101-quantum-tunnelling-composite/ on Apr. 11, 2016, 4 pages.

* cited by examiner

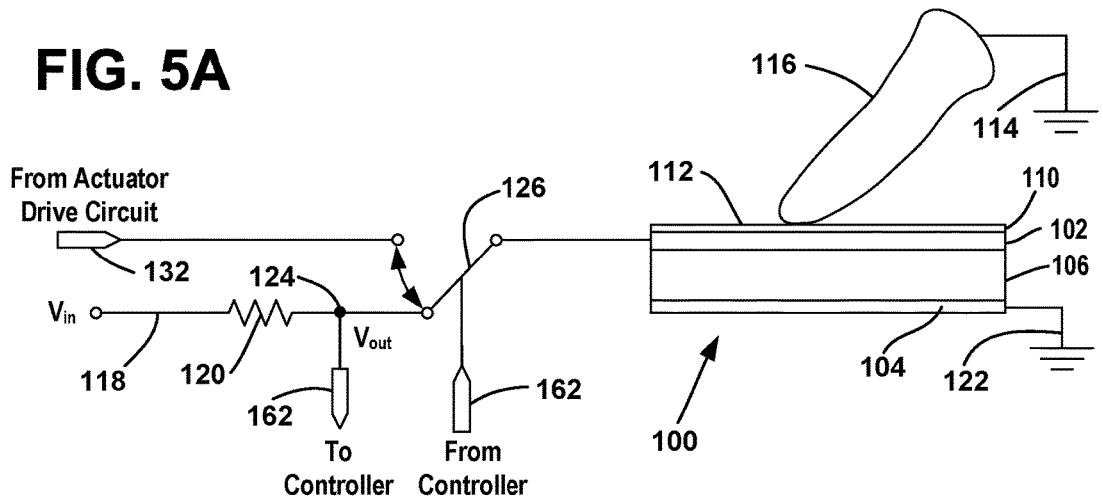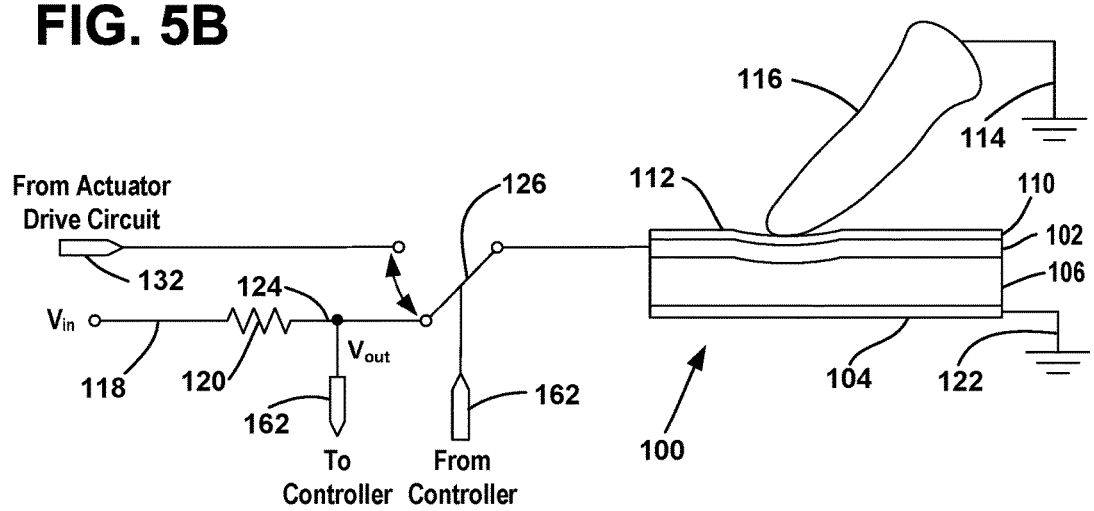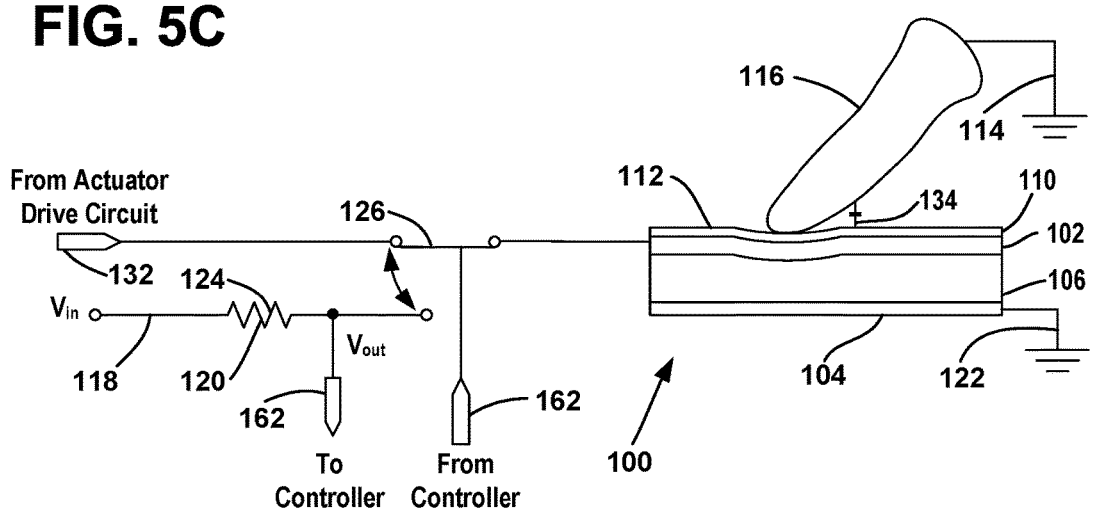

UNITARY SENSOR AND HAPTIC ACTUATOR

TECHNICAL DESCRIPTION

This patent relates to sensors and haptic actuators, and more particularly to unitary sensors and haptic actuators.

BACKGROUND

Haptic effects are used to enhance the interaction of an individual with an electronic device. Haptic effects enable the user to experience a touch sensation, which is typically generated by an actuator embedded in the device. Recent innovations have enabled the development of haptic actuators that generate an electrostatic force (ESF), which creates a capacitive coupling between a charged electrode and the electrically conductive tissues of a human. This capacitive coupling stimulates the skin and provides a tactile sensation. However, these ESF haptic actuators require a high voltage signal (e.g., 100-2000 Volts or higher) to generate an electrostatic force that is large enough to be felt by a user. Generating and delivering such a high voltage signal requires high voltage amplifiers, high voltage electrical components, and significant battery resources. These components are expensive and bulky, which results in packaging problems as manufacturers try to reduce the size of their components and devices.

Additionally, many devices having haptic actuators require a sensor to determine a condition upon which to deliver a haptic effect. The requirement of a separate sensor adds even more expense, complexity, and bulk to devices and systems that include haptic actuators.

Another issue with prior art haptic actuators, especially actuators that deliver haptic effects using electrostatic forces, is that they are typically rigid and do not lend themselves to sensing pressure. Nor do they have the flexibility to adapt to flexible or irregular substrates. These prior art devices have limited applications.

SUMMARY

One aspect of this document relates to a bi-functional apparatus for sensing touch and delivering a haptic signal. The bi-functional apparatus comprises first and second electrodes. The first electrode provides a haptic interface for delivering an electrostatic force and has a top surface and a bottom surface. A dielectric insulator covers the top surface of the first electrode. A sensor is positioned between the bottom surface of the first electrode and the second electrode. The sensor selectively provides electrical conductivity between the first and second electrodes in response to at least a threshold amount of pressure exerted against the dielectric insulator.

Another aspect is a bi-functional apparatus for sensing touch and delivering a haptic signal. The bi-functional apparatus comprises first and second electrodes. The first electrode provides a haptic interface for delivering an electrostatic force and has a top surface and a bottom surface. A dielectric insulator covers the top surface of the first electrode. A sensor is positioned between the bottom surface of the first electrode and the second electrode. The sensor selectively provides electrical conductivity between the first and second electrodes in response to at least a threshold amount of pressure exerted against the dielectric insulator. The sensor comprises a quantum tunneling composite. The combined first and second electrodes, dielectric insulator, and sensor are flexible and have a combined thickness in the range of about 0.1 mm to about 1 mm.

Another aspect is a bi-functional apparatus for sensing touch and delivering a haptic signal. The bi-functional apparatus comprises first, second, and third electrodes. The first electrode provides a haptic interface for delivering an electrostatic force and has a top surface and a bottom surface. A dielectric insulator covers the top surface of the first electrode. An electrical insulator is positioned between the bottom surface of the first electrode and the second electrode. A sensor is positioned between the second electrode and the third electrode. The sensor selectively provides electrical conductivity between the second and third electrodes in response to at least a threshold amount of pressure exerted against the dielectric insulator.

Another aspect is a method of sensing touch and delivering a haptic signal with a single device. The method comprises receiving an input at a touch surface of a dielectric insulator layered over a first electrode; in response to receiving the input at the touch surface, increasing the electrical conductivity of a sensor positioned between the first electrode and a second electrode; in response to increasing electrical conductivity of the sensor, conducting an electrical current between the first and second electrodes; and in response to conducting an electrical current between the first and second electrodes, applying a haptic drive signal to the first electrode, the haptic drive signal creating an electrostatic force in the dielectric insulator.

BRIEF DESCRIPTION OF THE DRAWINGS

FIGS. 5A-5C is a circuit and a cross-sectional view illustrating operation of the unitary haptic actuator shown in FIGS. 1 and 2.

DETAILED DESCRIPTION

Figure 1:
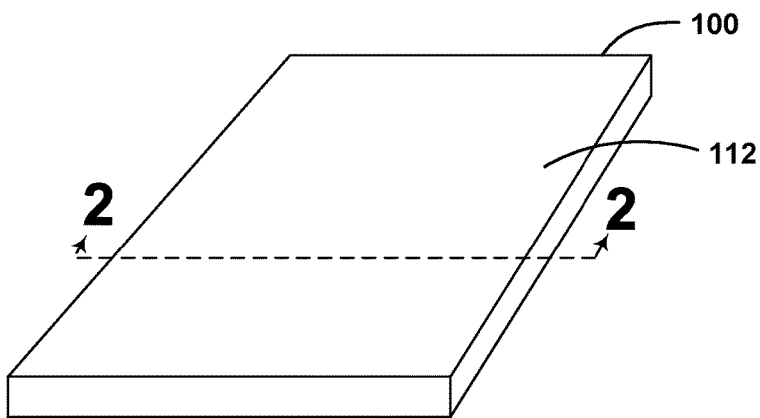
FIG. 1 is a top isometric view of a unitary haptic device.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms, this patent document relates to a unitary haptic device for delivering a haptic effect. The unitary haptic device is bi-functional and operates as both a touch sensor and a haptic actuator. A haptic effect can be any type of tactile sensation delivered to a person. In some embodiments, the haptic effect embodies information such as a cue, notification, feedback or confirmation of a user's interaction with a haptic-enabled article, or a more complex message or other information. In alternative embodiments, the haptic effect can be used to enhance a user's interaction with a device by simulating a physical property or effect such as friction, flow, and detents.

Figure 2:
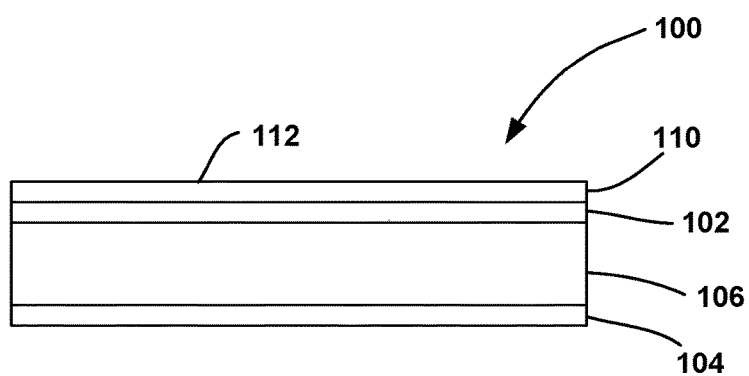
FIG. 2 is a cross-sectional view of the unitary haptic device illustrated in FIG. 1 taken along line 2-2.

Referring now to FIGS. 1 and 2, a possible embodiment of a unitary haptic device 100 comprises first and second electrodes 102 and 104. A sensor element 106 is positioned between the first and second electrodes 102 and 104. A protective layer 110 is positioned over the first electrode 102 and provides a touch surface 112. As discussed in more detail herein, the first electrode 102, second electrode 104, and sensor element 106 cooperate to sense when a user or object touches the touch surface 112, or in some embodiment moves proximal to the touch surface 112. Also as discussed in more detail herein, the first electrode 102 operates as a haptic actuator to deliver a haptic effect using electrostatic force (ESF) or transcutaneous electrical stimulation (TES). Other embodiments, however, can include structure additional to, or even in place of, the first electrode 102 to operate as the haptic actuator.

In at least some embodiments, the protective layer 110 is an electrical insulator formed with a dielectric material. Examples of dielectric materials that can be used to form the protective layer 110 include silicon dioxide ($SiO_2$); silicon nitride ($SiO_3N_4$); parylene; or composite coatings which can include organic or inorganic material. The dielectric material can be applied to the first electrode 102 using any suitable technical including deposition and sputtering. The sensor element 106 is a sensor that detects touch or, in some embodiments, close proximity to the touch surface 112. Examples of sensor elements 106 that detect touch include quantum tunneling composites, piezoresistive cells, photoresistors, and other materials that change electrical properties such as conductivity, resistance, inductance, or capacitance when exposed to or deprived of an external force or stimulation such as pressure or light.

In at least some embodiments, the first electrode 102 covers the entire surface of the sensor element 106. In alternative embodiments, a plurality of first electrodes 102, which are electrically isolated from each other, can be applied to the surface of the sensor element 106 in a pattern such as parallel ribbons, circles, triangles, an array of squares, an array of other shapes, and other geometric patterns and shapes.

Additionally, in some embodiments, the protective layer 110 and the first electrode 102 are flexible so that they can bend under pressure and exert pressure against the sensor element 106. In other embodiments, the entire unitary haptic device 100 is flexible. An advantage of the entire unitary haptic device 100 being flexible is that it can be applied to and conform to substrates having non-flat or otherwise irregular surface. For example, the unitary haptic device could be applied to the surface of universal touch pads, flexible displays, displays having curved glass, buttons, or even hand grips. It also makes manufacturing easier because the bendable or flexible unitary haptic device 100 may be applied more readily to substrates that are out of tolerance or have other defects in their surface.

The unitary haptic device 100 has an overall depth in the range of about 0.1 mm to about 1 mm, although other embodiments can have an overall depth that is smaller or greater than this range. This depth provides a thin, bi-functional sensor and haptic actuator that can be applied to a variety of different devices having a variety of different purposes. This thin depth of the unitary haptic device 100 is enabled by factors such as the overall structure of the unitary haptic device 100 and the type of materials used for each layer. The protective layer 110 has a thickness in the range of about $0.1\mu$ to about $1.5\mu$. In alternative embodiments, the protective layer 110 has a thickness in the range of about $0.5\mu$ to about $1\mu$. The thickness of the protective layer 110 depends on factors such as the material that is used to form the layer 110. If the protective layer 110 is formed with a dielectric material, the thickness of the layer 110 also depends on the desired dielectric constant for the layer 110; the thicker the layer 110 the higher the voltage that will be applied to the electrode to generate a haptic effect. The first and second electrodes 102 and 104 have a thickness in the range of about 20 nm to about $0.5\mu$. In alternative embodiments, the first and second electrode could have a thickness in the range of about 0.1 mm to about 1 mm. In yet other embodiments, the first and second electrodes have a thickness in the range of about 20 nm to about 1 mm. The sensor element 106 has a thickness in the range of about 0.1 mm and above. In alternative embodiments, the sensor has a thickness in the range of about 0.1 mm to about 1 mm. The thickness of the electrode element may depend on a variety of factors such as the material used to form the electrodes 102 and 104, the manufacturing process used to form the electrodes 102 and 104, and desired reliability and performance characteristics of the electrode 102 and 104. The thickness of the sensor element 106 may depend on a variety of factors such as the type of sensor being used, characteristics of electrical signals being applied to the unitary haptic device 100 such as voltage and current, the desired sensitivity of the sensor element 106, the resolution of the sensor element 106, the threshold value of the sensor element 106, and other performance characteristics for the unitary haptic device 100. Each of the individual layers 102, 104, 106, and 110 in alternative embodiments of the unitary haptic device 100 can have a thickness that is smaller or greater than the ranges provided above. Additionally, the actual depth of the unitary haptic device 100 and each of the individual layers 102, 104, 106, 110 may depend on the factors noted herein and on other factors. The depth and thickness also may depend on balancing performance of the unitary haptic device 100, design criteria, manufacturing constrains, and cost.

The unitary haptic devices disclosed herein and embodiment thereof have the flexibility to be implemented in different ways and have different embodiments. For example, the unitary haptic devices can be controlled to switch operation between a sensing mode and a haptic-delivery mode. Alternatively, some embodiment of the unitary haptic devices disclosed herein can simultaneously sense touch and deliver a haptic effect. Additionally, the unitary haptic device disclosed herein can embody alternative actuators to deliver haptic effect using techniques other than ESF and TES. Other types of actuators that can be embodied in a unitary haptic device as disclosed herein include piezoelectric cells, smart materials such as electroactive polymers, microfiber composites, shape memory polymers and metals, and any other material that vibrates or changes shape upon receiving external stimulation such as an electrical potential, electrical current, electrical field, magnetic field, or temperature change.

Figure 3:
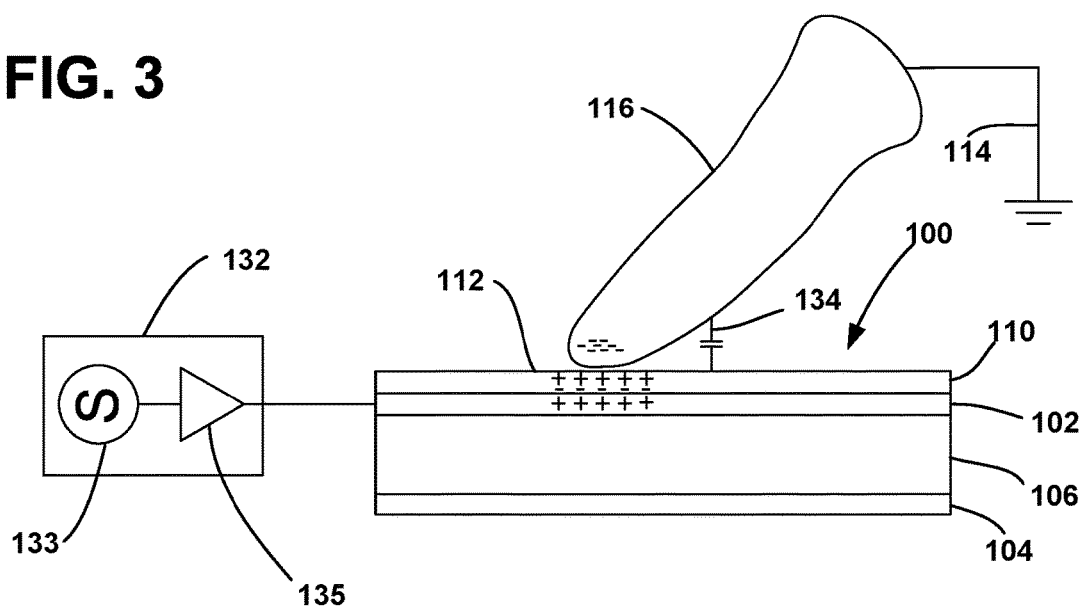
FIG. 3 is a cross-sectional view illustrating operation of the unitary haptic device shown in FIGS. 1 and 2 delivering an electrostatic force.

As illustrated in FIG. 3, when ESF is used to deliver a haptic effect as illustrated herein, an actuator drive circuit 132 is in electrical communication with the second electrode. The actuator drive circuit has a signal generator 133 and an amplifier 135. The signal generator 133 generates a signal having an alternating waveform and the amplifier 135 amplifies the signal to generate a haptic drive signal to apply to the first electrode 102 and create a capacitance 134 between the electrode 102 and the user's 116 finger, or other body part contacting the touch surface 112. The user's 116 skin provides a ground 114 relative to the first electrode 102.

In these embodiments, the protective layer 110 is an electrical insulator formed with a dielectric material, and the electrical potential causes charges in the protective layer 110 to separate, with charges of one polarity (e.g., positive) along the top or touch surface 112 of the protective layer 110 proximal to the user's 116 skin and charges of the opposite polarity (e.g., negative) to move along the bottom surface of the protective layer 110 proximal to the first electrode 102. In turn, charges having a polarity opposite to those along the touch surface 112 of the protective layer 110 (e.g., negative) accumulate in the portion of the user's 116 skin adjacent to the first electrode 102 and against the insulator 110. The opposite polarity generates a force that urges the skin toward the touch surface 112 of the dielectric insulator 110 thus creating a tactile sensation in the skin 116.

When an alternating signal (e.g., one alternating between positive and negative) is applied to the first electrode 102, the charges in the electrode 102 alternate between positive and negative. The alternating charges in the first electrode 102 in turn causes the charges proximal the touch surface 112 and bottom surface of the insulator 110 to alternative between positive and negative, which in turn causes the charges accumulating in the user's 116 skin adjacent to the first electrode 102 to alternate between positive and negative. This alternating polarity will cause the user's 116 skin to be alternatively forced toward the first electrode 102 and then released. If the user 116 is holding their fingertip or other portion of their body steady against the touch surface 112, the sensation of their skin moving up and down is felt as a vibration in the skin 116 creating a static haptic effect. If the user 116 is moving their fingertip, or other body part, along the touch surface 112, the skin will still vibrate, but it will create a dynamic haptic effect such as a sensation of friction, flow, or movement. In exemplary embodiments, the amplitude of the haptic drive signal applied to the first electrode 102 is in the range from about 50 V and higher. In exemplary embodiments for delivering a static ESF, the amplitude of the haptic drive signal is in the range from about 50 V to about 2,000 V. In exemplary embodiments when delivering a dynamic ESF, the amplitude of the haptic drive signal is in the range of about 500 V to about 2,000 V. Additionally, the stronger the haptic drive signal, the more likely the resulting ESF will be strong enough that a user will feel the haptic effect even with distractions in the environment around them. For most users, environments, and hardware configurations, a haptic drive signal having an amplitude of 500 V or higher will provide a haptic effect strong enough to feel in most situations and environments. Although certain ranges for the haptic drive signal are provided, other embodiments could use signals higher or lower than the ranges provided herein.

In embodiments that deliver haptic effects using TES, a small electrical current flows from the first electrode 102, through the protective layer 110, and into the user's 116 skin. In these embodiments, the protective layer 110 is formed with a material that has at least a limited amount of conductance to allow very low levels of electrical current to flow through it. The charges passing into the user's 116 skin stimulates receptors in the user's 116 nerves causing a tingling sensation, which delivers the haptic effect. In exemplary embodiments, the level of electrical current that flows from the first electrode 102 and into the user's 116 skin is in the range from about 1 mA to about 4 mA. In another exemplary embodiment, the level of current that flows from the first electrode 102 and into the user's 116 skin is in the range from about 2.5 mA to about 4 mA, which provides TES strong enough that a user 116 will feel the haptic effect even with distractions in the environment around them.

Figure 4A:
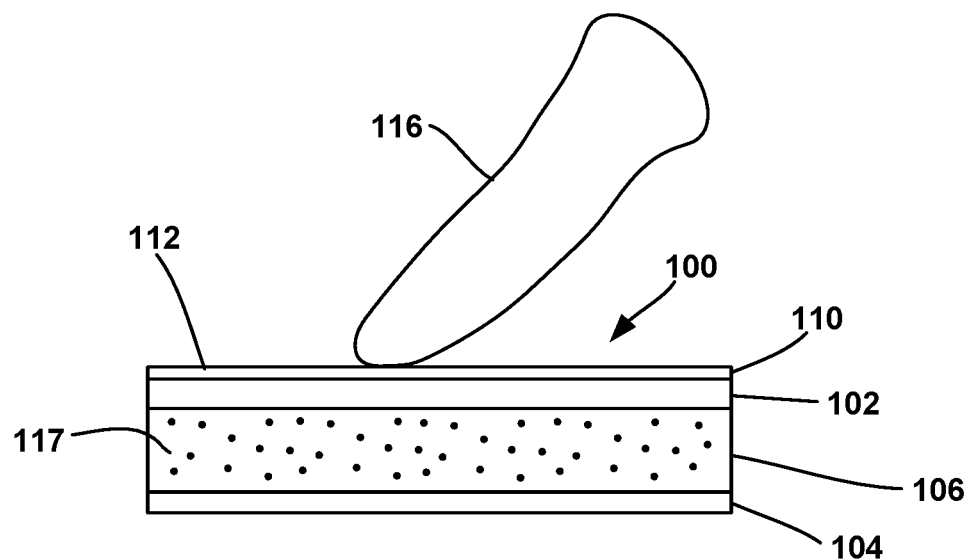
FIGS. 4A and 4B is a cross-sectional view illustrating operation of an embodiment of a sensor element in the unitary haptic device shown in FIGS. 1 and 2.
Figure 4B:
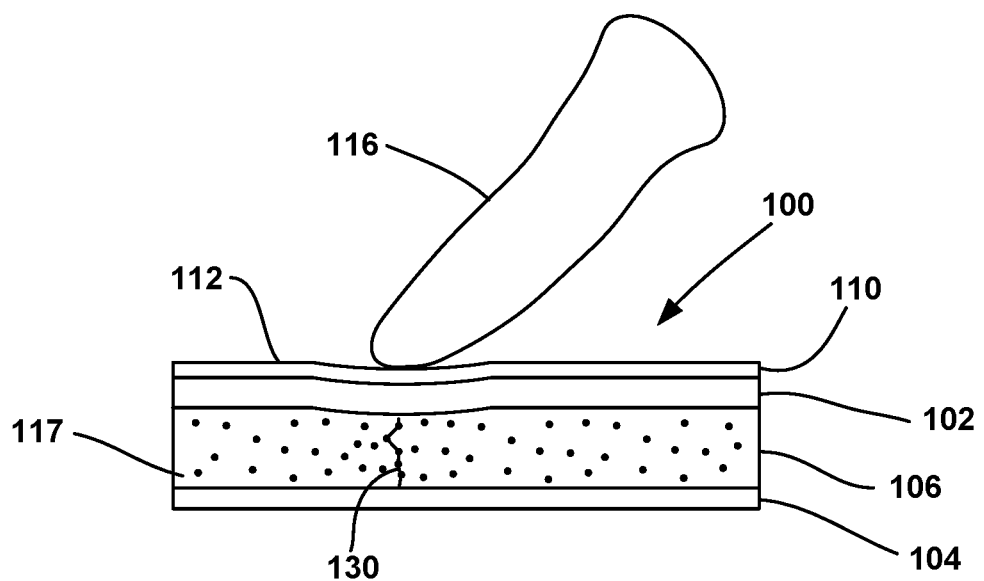

FIGS. 4A and 4B illustrate operation of an embodiment of the sensor element 106 in the unitary haptic device 100 that is formed with a quantum tunneling composite, which is a material that changes its electrical conductance (or electrical resistance) based on changes to the amount of compressive force applied against it. Quantum tunneling composites comprise a combination of conductive particles 117 such as metals and non-conductive material such as elastomeric binders. The conductive particles 117 are disbursed throughout the composite. When a quantum tunneling composite is not compressed, the conductive particles are relatively far apart so they have a relatively low conductance and high resistance to an electrical current. However, as compression of a quantum tunneling composite increases, the conductive particles are forced closer together and the conductivity of the quantum tunneling composite increases enabling electrical current to flow. The quantum tunneling composite functions as a variable resistor in which the resistance of the composite changes as a function of the pressure applied to it. The greater the pressure, the greater the conductance of the material and the lower the resistance of the material.

A quantum tunneling composite can be a polymer-based ink or gel and can be opaque or transparent. The quantum tunneling composite can be printed onto the second electrode 104, although the quantum tunneling composite can be applied to the second electrode 104 using alternative manufacturing techniques. In these embodiments, at least the protective layer 110 and first electrode 102 are flexible and can bend.

As illustrated in FIG. 4A, when there is no pressure exerted against the touch surface 112, the first electrode 102 and sensor element 106 do not bend, compress, or otherwise deform. In this state, the conductive particles 117 in the quantum tunneling composite are relatively far apart and provide a low conductance for, and high resistance to, the flow of electrons from one particle 117 to another. In this embodiment of a quantum tunneling composite, only a relatively low level of electrical current can flow through the depth of the sensor element 106. In alternative embodiments, however, the quantum tunneling composite operates as an electrical insulator so substantially no electrical current can flow entirely through the quantum tunneling composite and the electrons are prevented from flowing from the second electrode 104 to the first electrode 102.

As illustrated in FIG. 4B, when a user touches and exerts force against the touch surface 112, the protective layer 110 and the first electrode 102 deform and compress the sensor element 106. Compressing the sensor element 106 with enough force causes the conductive particles 117 in the quantum tunneling composite to move relatively close enough together so that electrons can move from conductive particle 117 to conductive particle 117. The conductivity of the quantum tunneling composite in the sensor element 106 increases, allowing electrons and hence electrical current 130 to flow from the second electrode 104 to the first electrode 102.

FIGS. 5A-5C illustrate operation of the unitary haptic device 100 in a control circuit that automatically switches operation of the unitary haptic device between a sensing mode and a haptic-delivery mode. In the illustrated embodiment, the sensor element 106 is formed with a quantum tunneling composite.

In this embodiment, a voltage divider 118 has first and second resistances or impedances connected in series. The first resistance 120 is in electrical series between a power supply, $V_{in}$, and a node 124. The second resistance is provided by the sensor element 106 and is in electrical series between the node 124 and ground 122 through the first and second electrodes 102 and 104. The node 124 is electrically connected to a controller 162 (discussed in more detail herein), which monitors the output voltage, $V_{out}$, at the node 124. A sensor switch 126 is a single pole, double throw switch that has a common terminal electrically connected to the first electrode 102, a first switched terminal electrically connected to the actuator drive circuit 132, and a second switched terminal electrically connected to the voltage divider 118. The sensor switch 126 switches electrical continuity for the first electrode 102 between the actuator drive circuit 132, and the input voltage, $V_{in}$, for the voltage divider 118. When the sensor switch 126 is switched to the second terminal, the first electrode 102 forms a part of and completes the voltage divider 118.

The voltage divider 118 forms a sensor circuit. Alternative embodiments can use circuits other than a voltage divider to determine when sensor element 106 has responded to a physical stimulation by changing a characteristic such as resistance or some other characteristic. The actuator drive circuit 132 is in electrical communication with the first electrode, and as discussed herein, the controller 162 controls when the actuator drive circuit 132 applies a haptic drive signal to the electrode 102.

Referring now to FIG. 5A, when the unitary haptic device 100 is being operated in a sensing mode, the sensor switch 126 is switched to provide continuity between the first electrode 102 and the input voltage, $V_{in}$. When the sensor switch 126 is in this position, the first electrode is connected to and completes the voltage divider 118. The sensor element 106 is not being compressed, or is being lightly compressed, so that the quantum tunneling composite has a relatively high electrical resistance and only a small electrical current can flow between the first and second electrodes 102 and 104 (e.g., FIG. 4A) to ground 122. In this uncompressed state, the controller 162 controls the actuator drive circuit 132 so that it does not deliver a haptic drive signal to the first electrode 102 at the same time the voltage divider is electrically connecting the input voltage, $V_{in}$, to the first electrode. In this state, the output voltage, $V_{out}$, at node 124 is slightly lower than the input voltage, $V_{in}$. In embodiments where the quantum tunneling composite is an open circuit when uncompressed, $V_{out}$ will equal $V_{in}$.

Referring now to FIG. 5B, when a person presses against the touch surface 112 and the sensor element 106 compresses enough to start decreasing the electrical resistance of the quantum tunneling composite between the first and second electrodes 102 and 104 (as shown in FIG. 4B), the value of the output voltage, $V_{out}$, at the node 124 will fall relative to the value it had when the sensor element 106 and quantum tunneling composite are in the uncompressed state as illustrated in FIG. 5A. In this transitional state, the controller 162 continues to control the actuator drive circuit 132 so that it does not deliver a haptic drive signal to the first electrode 102.

Referring now to FIG. 5C, when the sensor element 106 is compressed enough to sufficiently decrease the resistance of the quantum tunneling composite so the output voltage, $V_{out}$, at the node 124 falls below a threshold level, the controller 162 will switch the sensor switch 126 to disconnect the first electrode 102 from the input voltage, $V_{in}$, and connect the first electrode 102 to the actuator drive circuit 132. When the sensor switch 126 is in this position, the first electrode 102 is not connect to and does not form a part of the voltage divider 118. The unitary haptic device 100 is then switched from the sensing mode to the haptic-delivery mode. The controller 162 then controls the actuator drive circuit 132 to generate a haptic drive signal and apply it to the first electrode 102. Because the haptic drive signal can have a very high voltage in some embodiments, controlling the sensor switch 126 to disconnect the first electrode 102 from the voltage divider 118 also isolates the controller 162 from the output of the actuator drive circuit 132 so that the haptic drive signal cannot damage components in the controller 162. Operating the sensor switch 126 in this manner also prevents the input voltage, $V_{in}$, for the voltage divider 118 from providing a voltage offset to the haptic drive signal. Such an offset may adversely affect the haptic effect the controller 162 is trying to create such as the sensation of certain levels of friction of the flow of fluid.

In at least some exemplary embodiments, the controller 162 will cause the actuator drive circuit 132 to stop delivery of a haptic drive signal and then switch the sensor switch 126 after a determined period of time, returning the unitary haptic device 100 from the haptic-delivery mode back to the sensing mode. Other embodiments may switch operation of the unitary haptic device 100 from the haptic-delivery mode to the sensing mode upon occurrence of events other than the lapsing of a period of time.

In alternative embodiments, the sensor switch 126 can be a mechanical switch, a semiconductor device, or any other suitable switching mechanism. In other alternative embodiments, the sensor switch 126 is replaced with two single pole, single throw switches, with one switch connected in series between the actuator drive circuit 132 and the first electrode 102 and the other switch connected in series between the output voltage, $V_{out}$, and the first electrode 102. Other embodiments can have alternative types and arrangements of switches to provide continuity to the first electrode 102. Additionally, in lieu of the sensor switch 126 or any other switches, the controller 162 can contain circuitry and programming to control continuity to the first electrode 102 by enabling and disabling outputs from the actuator drive circuit 132 and the input voltage, $V_{in}$; by shielding the controller 162 from high voltages from the actuator drive circuit 132 that might be received through the voltage divider 118; and by programming the controller 162 to process and isolate voltages within aggregate voltage signals.

Alternative embodiments use a piezoresistive cell as the sensor element 106 in place of a quantum tunneling composite. A piezoresistive cell is a metal or semiconductor material that has a crystal lattice structure in which the crystals change shape and direction under stress. These embodiments operate in substantially the same way as described with reference to FIGS. 5A-5C, and the piezoresistive cell changes resistance as it bends or compresses and the crystal lattice structure is stressed. However, the response of the voltage divider 118 is the opposite as it is when the sensing element 106 is a quantum tunneling composite. The resistance of the piezoresistive cell is low when it is unstressed as illustrated in FIG. 5A, and thus the output voltage, $V_{out}$, at the node 124 is initially very low relative to the input voltage, $V_{in}$. As the sensor element 106 is placed under stress as illustrated in FIG. 5B, resistance of the piezoresistive cell increases and the output voltage, $V_{out}$, at the node 124 increases in response to a user 116 touching the touch surface 112 of the unitary haptic device 100. The controller 162 reads the new value of $V_{out}$ and determines whether it has risen above a threshold level to cause the controller 162 to switch operation of the unitary haptic device 100 from the sensor mode to the haptic-delivery mode as shown in FIG. 5C. In embodiments that use a piezoresistive cell as the sensor element 106, at least the protective layer 110 and first electrode 102 bend as force is exerted against the touch surface 112. The force then causes the piezoresistive cell to bend or compress. Although in at least some embodiments, the entire unitary haptic device 100, including the protective layer 110, first electrode 102, sensor element 106, and second electrode 104, is flexible or compressible.

Other alternative embodiments use a photoresistor as the sensor element 106. A photoresistor is a semiconductor having a low electrical resistance when exposed to light, but the resistance is variable and increases as the amount of light reaching the photoresistor falls. Accordingly, the output voltage, $V_{out}$, at the node 124 in the voltage divider 118 responds in substantially the same way as embodiments using a piezoresistive cell as the sensor element 106. In these embodiments, however, the resistance of the photoresistor, and hence the output voltage at the node 124, increases as a user's 116 finger approaches the touch surface 112 of the unitary haptic device 100 and blocks light from reaching the sensor element 106. When the output voltage, $V_{out}$, rises above a threshold level indicating that a user 116 has touched the touch surface 112, the controller 162 will switch operation of the unitary haptic device 100 from the sensing mode to the haptic-delivery mode. An alternative embodiment might set the threshold value for the output voltage, $V_{out}$, at a level indicating the user's 116 finger is proximal to the touch surface 116, but not necessarily touching the touch surface 112. The photoresistor is typically formed with a semiconductor material such as silicon, germanium, or compounds of gallium. The semiconductor material can be applied to the second electrode 104 using traditional fabrication techniques such as vapor deposition or sputtering. Alternative embodiments can use other materials to form the photoresistor.

In embodiments using a photoresistor as the sensor element 106, the controller 162 may be programmed to receive input from an additional sensor measuring ambient light in the environment where the unitary haptic device is operating. In these embodiments, the controller 162 may then adjust the threshold value of the output voltage, $V_{out}$, according to the measured level of ambient light such that the threshold value of the output voltage will be lower if the ambient light is lower and the threshold value of the output voltage will be higher if the ambient light is brighter. Alternatively, the controller 162 can continuously monitor and calculate a running average for the value of the output voltage, $V_{out}$, which would correspond to the amount of ambient light in the environment where the unitary haptic device 100 is operating. A higher average value of the output voltage would correspond to brighter ambient light and a lower average value of the output voltage would correspond to a lower level of ambient light. The controller 162 can then use this running average of the output voltage to adjust the threshold value for the output value at which the controller 162 switches operation of the unitary haptic device 100 from the sensing mode to the haptic-delivery mode. Additionally, because embodiments using a photoresistor rely on sensing light and are not responsive to bending or compressing the sensor element 106, the first electrode 102 and sensing element 106 can be rigid and non-compressible. Although in alternative embodiments, the unitary haptic device 100 may be flexible or compressible, or individual layers within the unitary haptic device may be flexible or compressible. Additionally, in these embodiments, at least the protective layer 110 and the first electrode 102 have sufficient transparency to let ambient light pass to the sensor element 106. An advantage of these embodiments is that a system can be programed to deliver haptic effects when a user's 116 finger or another pointer is proximal to, but not touching, the touch surface 112.

Figure 6A:
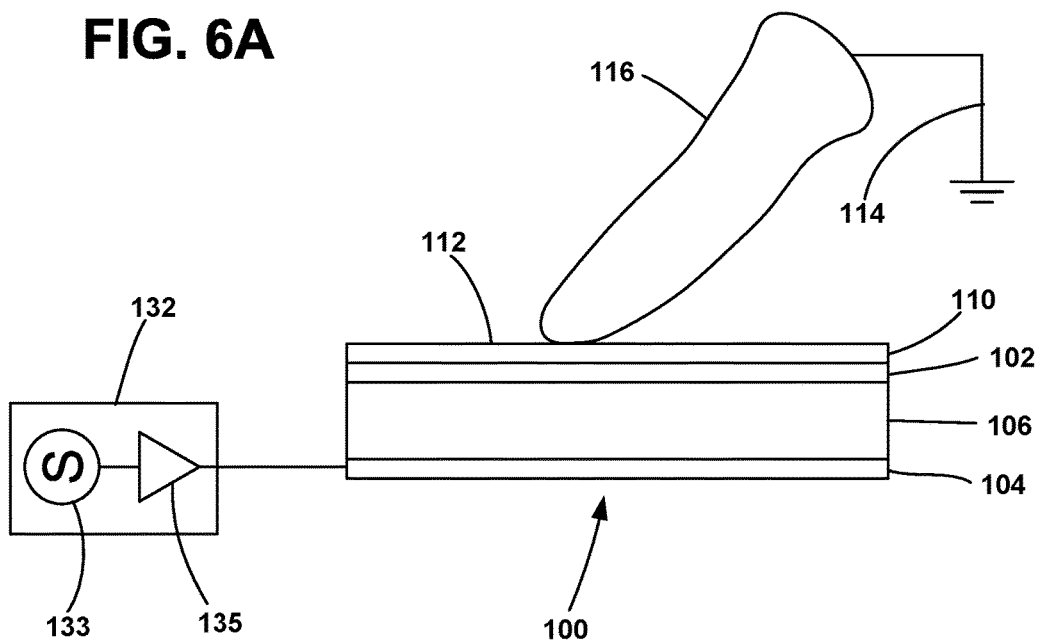
FIGS. 6A and 6B is a circuit and a cross-sectional view illustrating an alternative operation of the unitary haptic device shown in FIGS. 1 and 2.
Figure 6B:
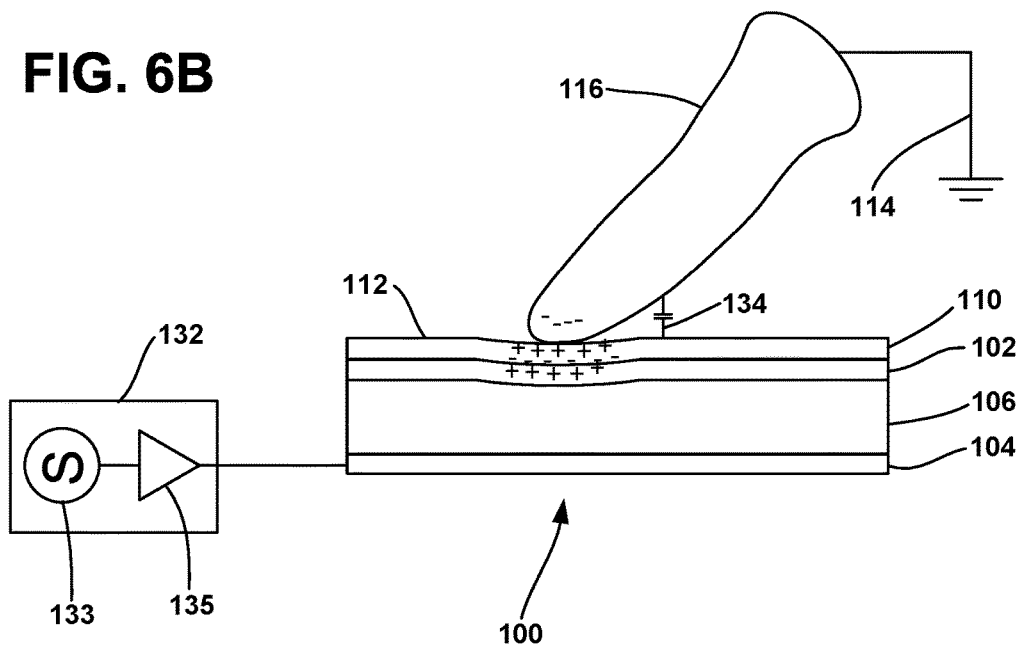

FIGS. 6A and 6B illustrate an embodiment of the unitary haptic device 100 configured to simultaneously sense touch and deliver a haptic effect using ESF or TES. In this embodiment, the actuator drive circuit 132 is in electrical communication with the second electrode 104. As illustrated, this embodiment uses a sensor element 106 having a material that has increasing conductance and decreasing resistance as it is compressed such as quantum tunneling composites as disclosed herein or a similar material. When the sensor element 106 reaches a certain level of compression it realizes a sufficiently high conductivity that results in minimal attenuation of a signal applied to the second electrode 104.

In operation, with reference to FIG. 6A, when a user is not touching or exerting a force against the touch surface 112 of the unitary haptic device 100, the sensor element 106 is not stimulated and provides a high electrical resistance so only a small current flows from the second electrode 104 and the first electrode 102. The amplitude of the haptic drive signal that flows through the sensor element 106 to the first electrode 102 is so low that a user cannot sense any stimulation and a haptic effect cannot be delivered to a user 116. In an alternative embodiment, the quantum tunneling composite in the sensor element 106 provides an open circuit and electrically isolates the first electrode 102 from the second electrode 104 and the actuator drive circuit 132.

As illustrated in FIG. 6B, however, as the user 116 exerts pressure against the touch surface 112, the sensor element 106 is compressed and the conductivity increases and the amplitude of the haptic drive signal flowing from the second electrode 104 to the first electrode 102 increases. When conductivity of the quantum tunneling composite reaches a high enough level, the amplitude of the actuator drive signal reaching the first electrode 102 becomes high enough to generate a potential between the first electrode 102 and the user's 116 skin that is sufficient to generate an ESF and deliver a haptic effect, or high enough to conduct a current through the first electrode 102 and the protective layer 110 that is sufficient to deliver TES and deliver a haptic effect.

An advantage of the embodiment illustrated in FIGS. 6A and 6B is that it continuously monitors pressure exerted against the unitary haptic device 100. In at least some embodiments, as pressure changes the amplitude of the haptic drive signal that is conducted from the second electrode 104 to the first electrode 102 changes, which can change the strength of the haptic effect.

Alternative embodiments of the unitary haptic device 100 that simultaneously sense touch and deliver haptic effects are possible. For example, the unitary haptic device 100 can use any suitable sensor elements other than quantum tunneling composites that pass the haptic drive signal from the second electrode 104 to the first electrode 102 with minimal attenuation so that the signal has sufficient amplitude or current to deliver an ESF or TES, respectively. Additionally, alternative embodiments might use haptic actuators other than a single electrode (e.g., first electrode 102) for delivering an ESF or TES. Examples of alternative actuators include piezoelectric cells, smart materials such as electroactive polymers, microfiber composites, shape memory polymers and metals, and any other material that vibrates or changes shape upon receiving external stimulation such as an electrical potential, electrical current, electrical field, magnetic field, or temperature change.

Figure 7:
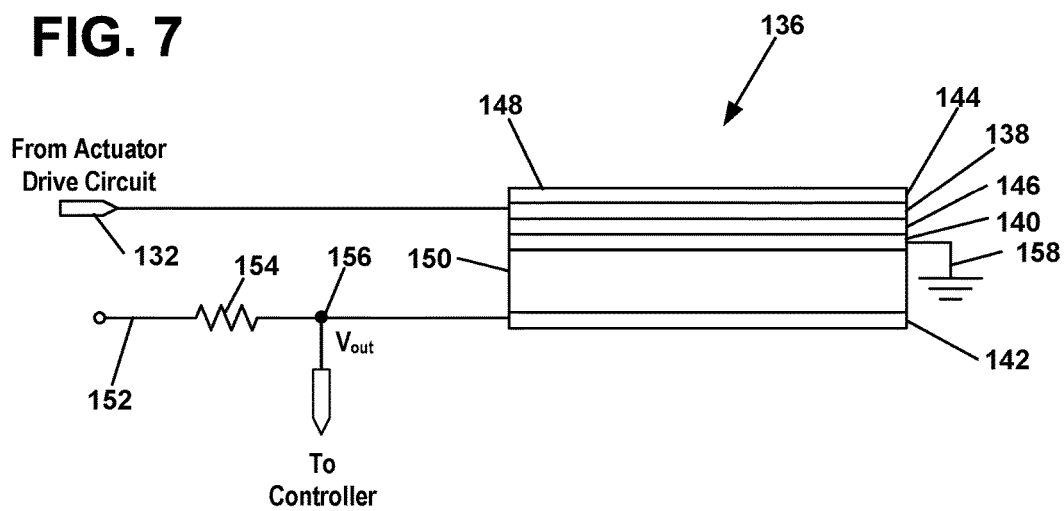
FIG. 7 is a cross-sectional view illustrating an alternative embodiment of the unitary haptic device shown in FIGS. 1 and 2.

FIG. 7 illustrates an alternative embodiment of a unitary haptic device. In this alternative embodiment, a unitary haptic device 136 includes a first electrode 138, second electrode 140, and third electrode 142. A protective layer 144 is substantially similar to the protective layer 110 and covers the first electrode 138. The protective layer 144 has a touch surface 148. An electrical insulator 146 is positioned between and isolates the first and second electrodes 138 and 140. A sensor element 150 is positioned between the second electrode 140 and the third electrode 142. As discussed herein, for unitary haptic devices 136 that deliver haptic effects using ESF, the protective layer 144 is an insulator formed with a dielectric material. The sensor element 150 is substantially similar to the sensor element 106 discussed herein and detects touch or, in some embodiments, proximity to the touch surface 148. Examples of sensor elements 150 that detect touch include quantum tunneling composites, piezoresistive cells, photoresistors, and other materials that change electrical properties such as conductivity or capacitance when exposed to or deprived of an external stimulation or force such as pressure or light. Photoresistors also are able to detect proximity. If the sensor element 150 is a photoresistor, at least the protective layer 144, first and second electrodes 138 and 140, and electrical insulator 146 are substantially transparent so ambient light can reach the sensor element 150 and stimulate the photoresistor so that is has minimal electrical resistance. The unitary haptic device 136 can have flexibility and transparency characteristics similar to unitary haptic device 100.

When implemented, the unitary haptic device 136 illustrated in FIG. 7 operates similar to the embodiments illustrated in FIGS. 5A-5C. A voltage divider 152 is formed with a first resistance or impedance 154 that is in series with a node 156. A second resistance or impedance is provided by the sensor element 150, which is in electrical series between the resistor 154 and ground 158 through the third electrode 142 and second electrode 140. An output voltage, $V_{out}$, is output at the node 156. The voltage divider 152 forms a sensor circuit. Additionally, the first electrode 138 is electrically connected to the actuator drive circuit 132. As the output voltage, $V_{out}$, from the voltage divider changes and moves past a threshold value, the controller 162 will determine that a haptic effect should be delivered to a user 116 and control the actuator drive circuit to deliver a haptic signal to the first electrode 138.

An advantage of this embodiment is that it simultaneously monitors the user's 116 interaction with the unitary haptic device 136 and delivers a haptic effect. The controller 162 can be programmed to continuously monitor the output voltage, $V_{out}$. As the force the user 116 exerts against the unitary haptic device 136 changes, the output voltage, $V_{out}$, at the node 156 also changes. The controller 162 can be programmed to sense the output voltage, $V_{out}$, and then modify one or more electrical characteristics of the haptic drive signal in real-time with respect to sensing a change in the output voltage while continuing to monitor the output voltage, although there may be at least some delay between sensing a change in the output voltage and changing a characteristic of the haptic drive signal due to latency in performance of the sensors, processing speeds of the processors, and other factors. Another advantage of this embodiment is that the electronics interfacing the unitary haptic device 136 with the controller 162 do not need switching and are less complex, less prone to failure, require less power, and have smaller packaging requirements. Additionally, programming the controller 162 is simpler at least because the controller 162 does not need to switch the unitary haptic device 136 between sensing and haptic modes and does not need to enable and disable sensing and haptic delivery circuits.

Figure 8:
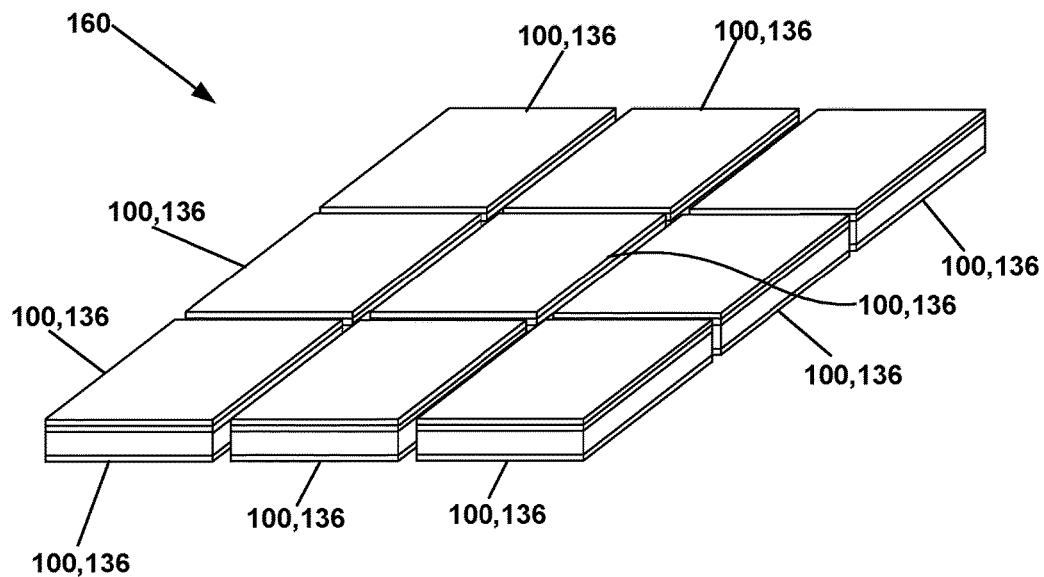
FIG. 8 is an isometric view illustrating a user interface formed with a plurality of the unitary haptic devices shown in FIGS. 1 and 2 or FIG. 7.

FIG. 8 illustrates an embodiment of a segmented user interface 160 using a plurality of unitary haptic devices 100 or 136. The unitary haptic devices 100 or 136 can be arranged randomly or in any pattern. The illustrated embodiment is a 3×3 array of unitary haptic devices 100 or 136, although alternative embodiments can use more or fewer unitary haptic devices 100 or 136. Other embodiments can arrange the unitary haptic devices 100 or 136 in different patterns such as circles, ovals, rectangles, squares, triangles, or any other shape or geometric arrangement. Additionally, embodiment might include two separate groups of unitary haptic devices 100 or 136, with each group positioned in a separate portion of a user interface. The user interface can be a display, touch pad, or any other surface with which a user interacts. In these embodiments, each of the unitary haptic devices 100 or 136 in the segmented user interface 160 can be controlled by separate and individual sensing circuits and haptic delivery circuits. Accordingly, each unitary haptic device 100 or 136 can be controlled individually, and can be controlled to deliver a different haptic effect and to respond to different pressures. For example, one unitary haptic device 100 or 136 can be controlled to deliver a haptic effect upon sensing a first pressure and a different unitary haptic device 100 or 136 can be controlled to deliver a haptic effect upon sensing a second, different pressure.

Figure 9:
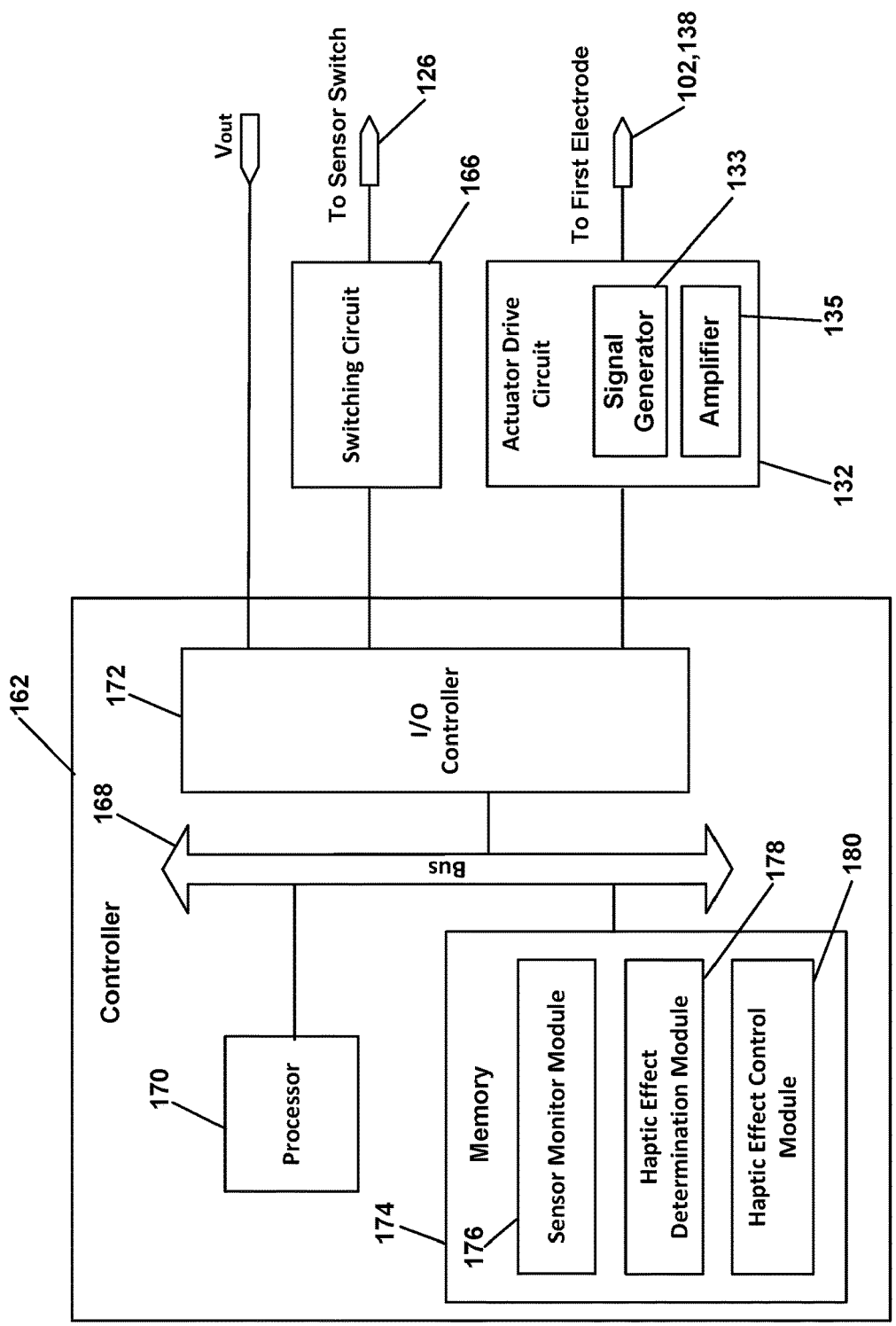
FIG. 9 is a functional block diagram of a control circuit for controlling unitary haptic devices illustrated in FIGS. 1-8.

Referring now to FIG. 9, a controller 162 for the unitary haptic devices 100 or 136 includes a bus 168, a processor 170, an input/output (I/O) controller 172 and a memory 174. The bus 168 couples the various components of the controller 162, including the I/O controller 172 and memory 174, to the processor 170. The bus 168 typically comprises a control bus, address bus, and data bus. However, the bus 168 can be any bus or combination of busses suitable to transfer data between components in the controller 162. The controller 162 also may interface with a switching circuit 166 for controlling the sensor switch 126.

The processor 170 can comprise any circuit configured to process information and can include any suitable analog or digital circuit. The processor 170 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor 170 can comprise a single unit, or a combination of two or more units, with the units physically located in a single controller or in separate devices.

The I/O controller 172 comprises circuitry that monitors the operation of the controller 162 and peripheral or external devices. As disclosed herein, the output voltage, $V_{out}$, from the nodes 124 or 156 is input to the I/O controller 172, which then communicates this value to the processor 170 for processing. The I/O controller 172 also manages data flow between the controller 162 and peripherals or external devices (not shown). The external devices can reside in the same device in which the controller 162 and unitary haptic devices 100 or 136 are incorporated or can be external to the system. Examples of other peripheral or external devices with which the I/O controller 172 can interface include sensors, external storage devices, monitors, input devices such as keyboards, mice or pushbuttons, external computing devices, mobile devices, transmitters/receivers, and antennas.

The memory 174 can comprise volatile memory such as random access memory (RAM), read only memory (ROM), electrically erasable programmable read only memory (EEPROM), flash memory, magnetic memory, optical memory or any other suitable memory technology. The memory 308 can also comprise a combination of volatile and nonvolatile memory.

The memory 174 is configured to store a number of program modules for execution by the processor 170, including a sensor monitor module 176, a haptic effect determination module 178, and a haptic effect control module 180. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller 162.

In an example embodiment, the sensor monitor module 176 monitors the output voltage, $V_{out}$, output at the node 124 or 156 and determines when a haptic effect should be delivered to a user 116. An example technique that the sensor monitor module 176 can use to determine whether to deliver a haptic effect includes a comparator or a pointer. The sensor monitor module 176 would monitor the output voltage, $V_{out}$, at the node 124 or 156 and compare it to a determined value, and determine a haptic effect should be delivered when the output voltage is less than the determined or threshold value (if the sensor element is a quantum tunneling composite) or greater than the determined or threshold value (if the sensor element is a piezoresistor or photoresistor). In another embodiment, the sensor monitor module 176 uses alternative calculations to process the output voltage, $V_{out}$, to determine whether to deliver a haptic effect. In yet another embodiment, the sensor monitor module 176 references the output voltage, $V_{out}$, to a lookup table to determine whether to deliver a haptic effect.

In an example embodiment, the haptic effect determination module 178 determines which haptic effect to deliver through the unitary haptic device 100 or 136. An example technique that the determination module 178 can use to determine which haptic effect to deliver includes rules programmed to make decisions to select a haptic effect. For example, the controller 162 may interface with GPS receiver or other location tracking device and determine different haptic effects that should be delivered based on the user's location and whether they are moving. In another example, the controller 162 may determine the haptic effect that should be delivered based on an application being executed by an electronic device, a particular event that occurred when executing an application, or data that was received from an external sensor or third party device.

In an alternative embodiment, a lookup table references values for the output voltage. $V_{out}$, to different haptic effects. The haptic effect determination module 178 then references the output voltage, $V_{out}$, to the lookup table to determine which haptic effect to deliver. For embodiments utilizing unitary haptic device 136 and implementations that simultaneously monitor contact and deliver haptic effects as illustrated in FIG. 7, the haptic effect determination module 178 can continuously compare the output voltage, $V_{out}$, to the lookup table and modify the haptic effect that is delivered to the user 116 as pressure or contact applied against the unitary haptic device 136 changes.

Upon the haptic effect determination module 178 determining which haptic signal to deliver to the unitary haptic device 100 or 136, it communicates that determination to the haptic effect control module 180. For embodiments that utilize the unitary haptic device 100, the haptic effect control module 180 then communicates a command to the switching circuit 166 to control the sensor switch 126 to open thereby changing the unitary haptic device 100 from the sensing mode to the haptic-delivery mode. For embodiments that utilize the unitary haptic device 136, which simultaneous senses touch and delivers haptic effects, the haptic effect control module 180 may not generate switching command.

Additionally, the haptic effect control module 180 obtains the electrical parameters or characteristics that correspond to the determined haptic effect. The haptic effect control module 180 communicates the electrical parameters to the I/O controller 172, which then generates a haptic signal embodying the electrical parameters provided by the haptic effect control module 180. The I/O controller 172 communicates the haptic signal to the actuator drive circuit 132, which generates an alternating waveform and amplifies the waveform to generate the haptic drive signal. The actuator drive circuit 132 applies the haptic drive signal to the first electrode 102 or 138 in the unitary haptic device 100 or 136, respectively. The I/O controller 172 and the actuator drive circuit 132 may perform additional processing to the haptic signal and haptic drive signal.

Examples of signal parameters that can be used to generate the haptic signal include frequency, amplitude, phase, inversion, duration, waveform, attack time, rise time, fade time, and lag or lead time relative to an event. Additionally, although the actuator drive circuit 132 is disclosed as having a signal generator, alternative embodiments may output a signal that is not alternating. Examples of signals and waveforms for the haptic signal and the haptic drive signal include direct current signals, alternating current signals, alternating voltage signals, square waves, sinusoidal waves, step signals, triangle waves, sawtooth waves, and pulses.

In an alternative embodiment, there is no determination of the haptic effect to be delivered through the unitary haptic device 100 or 136 or the electrical parameters to use for generating the haptic drive signal. In such an embodiment, the controller 162 is simply programed, or even hard wired, to deliver a determined haptic drive signal to the unitary haptic device 100 or 136.

The unitary haptic devices 100 and 136, and alternative embodiments thereof, can be used in a variety of applications. Examples include computing devices such as desktop computers, laptops, tablets, smartphones and other cellular phones; wearable devices such as smartphones; gaming devices such as consoles and controllers; vehicles; machinery; medical devices such as surgical equipment, catheters, monitors, orthoscopic devices, surgical simulators, surgical robots; instrumentation; keypads; robot controllers, and any other thing having electronics and a user interface. Additionally, the unitary haptic device 100 and 136, and alternative embodiments thereof, can be used in conjunction with touchpads; touch displays, including capacitive touch displays, and other user interfaces. Additionally, when used on displays and similar interfaces, the unitary haptic device 100 and 136 are substantially transparent and form a layer of the display or other interface.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The claims are:

1. A bi-functional apparatus for sensing touch and delivering a haptic signal, the bi-functional apparatus comprising:
    a first electrode and a second electrode, the first electrode providing a haptic interface for delivering an electrostatic force to a user, the first electrode having a top surface and a bottom surface;
    a dielectric insulator covering the top surface of the first electrode; and
    a sensor positioned between the bottom surface of the first electrode and the second electrode, the sensor selectively providing electrical conductivity between the first electrode and the second electrode in response to at least a threshold amount of pressure exerted against the dielectric insulator.

2. The bi-functional apparatus of claim 1 wherein the sensor comprises a quantum tunneling composite.

3. The bi-functional apparatus of claim 1 wherein the sensor comprises a photoresistor.

4. The bi-functional apparatus of claim 1 wherein the sensor comprises a piezoresistor.

5. The bi-functional apparatus of claim 1 wherein each of the first electrode, the second electrode, the dielectric insulator, and the sensor are substantially transparent.

6. The bi-functional apparatus of claim 1 wherein the sensor has a thickness in a range of about 1 mm or less.

7. The bi-functional apparatus of claim 6 wherein the first electrode, the second electrode, the dielectric insulator, and the sensor have a combined thickness of about 1 mm or less.

8. The bi-functional apparatus of claim 1 wherein:
    the first electrode comprises a plurality of electrodes arranged in a pattern; and
    the sensor is positioned between the plurality of electrodes and the second electrode.

9. The bi-functional apparatus of claim 1 wherein the dielectric insulator and the first electrode are flexible.

10. The bi-functional apparatus of claim 9 wherein each of the dielectric insulator, the first electrode, the second electrode, and the sensor are flexible.

11. The bi-functional apparatus of claim 1 further comprising:
    a substrate, the substrate comprising a surface, at least a portion of the surface being non-flat; and
    at least a portion of the second electrode is mounted on a non-flat portion of the surface.

12. The bi-functional apparatus of claim 1 further comprising:
    a power supply in electrical communication with the first electrode, the power supply providing a potential between about 500 V and about 2,000 V.

13. The bi-functional apparatus of claim 12 further comprising:
    a sensor circuit, the sensor circuit configured to generate an output voltage upon the sensor providing electrical conductivity between the first and second electrodes; and
    a programmable circuit in communication with the sensor circuit and the power supply, the programmable circuit programmed to receive the output voltage from the sensor circuit and to control the power supply to provide the potential to the first electrode upon the output voltage reaching a threshold value.

14. The bi-functional apparatus of claim 13 wherein the sensor circuit comprises a voltage divider.

15. A bi-functional apparatus for sensing touch and delivering a haptic signal, the bi-functional apparatus comprising:
    a first electrode and a second electrode, the first electrode providing a haptic interface for delivering an electrostatic force to a user, the first electrode having a top surface and a bottom surface;
    a dielectric insulator covering the top surface the first electrode;
    a sensor positioned between the bottom surface of the first electrode and the second electrode, the sensor selectively providing electrical conductivity between the first electrode and the second electrode in response to at least a threshold amount of pressure exerted against the dielectric insulator, the sensor comprising a quantum tunneling composite; and
    wherein the first electrode, the second electrode, the dielectric insulator, and the sensor are flexible and have a combined thickness of about 1 mm or less.

16. A bi-functional apparatus for sensing touch and delivering a haptic signal, the bi-functional apparatus comprising:
    a first electrode, a second electrode, and a third electrode, the first electrode providing a haptic interface for delivering an electrostatic force to a user, the first electrode having a top surface and a bottom surface;
    a dielectric insulator covering the top surface of the first electrode;
    an electrical insulator positioned between the bottom surface of the first electrode and the second electrode; and
    a sensor positioned between the second electrode and the third electrode, the sensor selectively proving electrical conductivity between the second electrode and the third electrode in response to at least a threshold amount of pressure exerted against the dielectric insulator.

17. The bi-functional apparatus of claim 16 wherein the second electrode is grounded, the bi-functional apparatus further comprising:
    a power supply in electrical communication with the first electrode;
    a sensor circuit in electrical communication with the third electrode, the sensor circuit configured to generate an output voltage upon the sensor providing electrical conductivity between the first electrode and the second electrode; and a programmable circuit in communication with the power supply and the sensor circuit, the programmable circuit programmed to receive the output voltage from the sensor circuit and to control the power supply to provide a potential to the first electrode upon the output voltage reaching a threshold value.

18. The bi-functional apparatus of claim 16 wherein a combined thickness of the first electrode, the second electrode, the third electrode, the dielectric insulators, the electrical insulator, and the sensor is about 1 mm or less.

19. A method of sensing touch and delivering a haptic signal with a single device, the method comprising:

receiving an input at a touch surface of a dielectric insulator layered over a first electrode;

in response to receiving the input at the touch surface, increasing electrical conductivity of a sensor positioned between the first electrode and a second electrode;

in response to increasing electrical conductivity of the sensor, conducting an electrical current between the first and second electrodes; and in response to conducting an electrical current between the first electrode and the second electrode, applying a haptic drive signal to the first electrode, the haptic drive signal creating an electrostatic force to a user.

20. The method of claim 19 wherein:

receiving an input at a touch surface comprises receiving a force exerted against the touch surface; and increasing electrical conductivity of the sensor comprises compressing a quantum tunneling composite in response to receiving the force exerted against the touch surface.

21. The method of claim 19 wherein:

receiving an input at a touch surface comprises receiving a force exerted against the touch surface; and increasing electrical conductivity of the sensor comprises stressing a piezoresistor in response to receiving a force exerted against a touch surface.

22. The method of claim 19 wherein:

receiving an input at the touch surface comprises blocking at least some light from passing though the touch surface and through the first electrode; and increasing electrical conductivity of the sensor comprises blocking at least some light from reaching a photoresistor.

23. The method of claim 19 further comprising deforming the dielectric insulator and the first electrode in response to the force exerted against the touch surface of the dielectric insulator.

24. The method of claim 19 wherein the haptic drive signal has a voltage in a range between about 500 V and about 2,000 V.

* * * * *